May 8, 1928.

S. T. HOYT 1,668,591

METHOD OF DRYING FRUITS, VEGETABLES, AND THE LIKE

Filed April 22, 1926

Inventor
Simes T. Hoyt

By O'Neill Bunn
Attorneys

Patented May 8, 1928.

1,668,591

UNITED STATES PATENT OFFICE.

SIMES T. HOYT, OF HONOLULU, TERRITORY OF HAWAII, ASSIGNOR TO HAWAIIAN PINEAPPLE COMPANY, LIMITED, OF HONOLULU, TERRITORY OF HAWAII.

METHOD OF DRYING FRUITS, VEGETABLES, AND THE LIKE.

Application filed April 22, 1926. Serial No. 103,830.

The invention relates to a simple and efficient method of drying fruits, vegetables and like commodities, containing a large percentage of moisture, expeditiously and without impairing the flavor and color of the dried product, the method comprising subjecting the fruit or other commodity to be dried to the action of rapidly circulating steam under low absolute pressure and a degree of superheat which will expedite the drying action without impairing the quality of the product.

Figure 1:
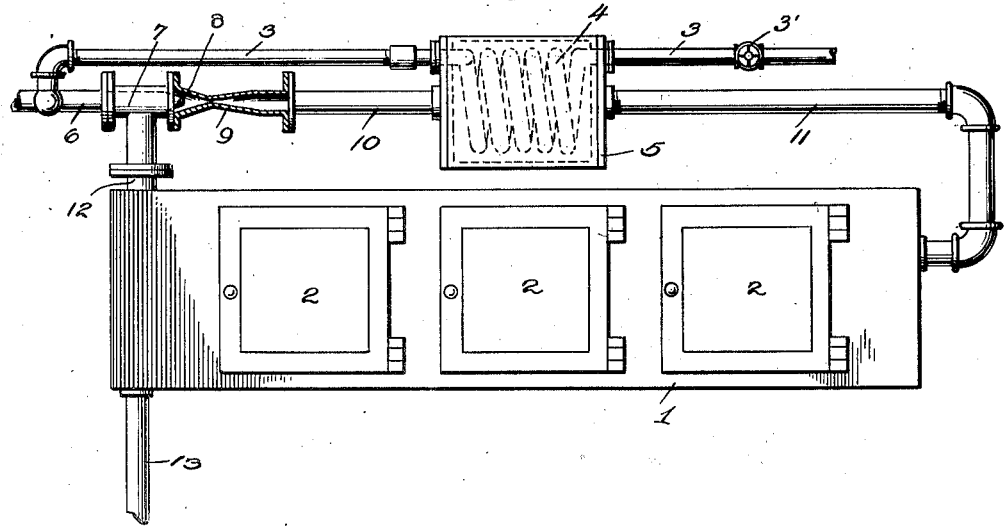
Figure 2:
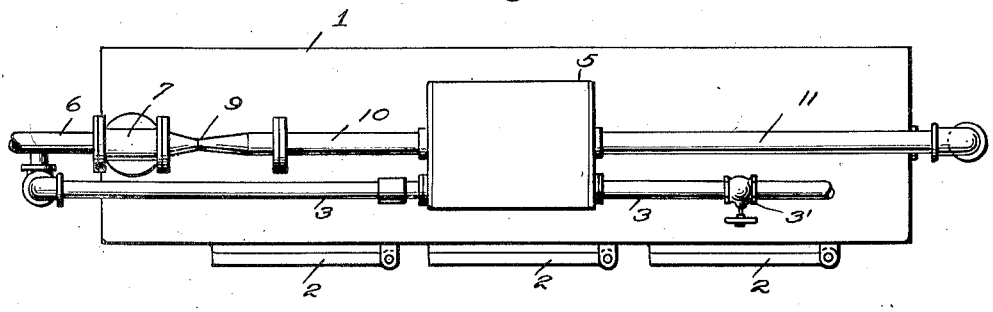

A simple form of apparatus for carrying out the method is illustrated in the accompanying drawings, in which:

Fig. 1 is a side elevation of the same.
Fig. 2 is a plan view.

Referring to the drawings, 1 indicates an enclosed chamber or container to receive the fruit or other material to be dried, which is delivered to the container through the doors 2, 2, which are adapted to be closed by suitable air-tight joints. A suitable steam line 3, provided with a regulating valve 3', includes a coil 4 enclosed within a heating chamber 5, the said steam line 3 being continued beyond the heater and connected to a pipe 6, which, in turn, is connected to a T-coupling 7, the end of the pipe 6 passing through the horizontal arm of the T-coupling and terminating in a constricted nozzle 8, the discharge orifice of the nozzle 8 being in alignment with a Venturi tube 9, so that said nozzle and tube 9 constitute a high powered pump or injector, the discharge end of which is coupled to a pipe section 10, which opens into the heater element 5, the latter being connected by pipe 11 with one end of the chamber 1. The upper portion of the opposite end of the chamber 1 is connected by a pipe 12 with the T-coupling 7, the several parts being so arranged that the action of the steam jet pump will effect a rapid circulation of steam through the enclosed chamber or receptacle 1 in which the fruit or other material is contained.

It is perfectly obvious, however, that steam under pressure considerably in excess of that of the atmosphere will be so hot as to cook and scorch ordinary fruits and similar commodities, and, obviously, the steam must contain sufficient superheat to evaporate the moisture in the fruit to effect the drying operation. In order to meet these conditions, a high degree of vacuum or relatively low absolute pressure is constantly maintained in the chamber 1 during the drying operation, the chamber being connected by pipe 13 with a condenser and air pump for maintaining the desired vacuum or low absolute pressure and also for removing the excess steam, which is driven off from the product. The outlet 13 being in the bottom of the drying chamber, the non-condensible vapors, such as air, carbon dioxide, or the like, all of which are heavier than steam, will be withdrawn through this exhaust pipe 13 by the air pump, thereby keeping the atmosphere within the drying chamber comparatively free from gases or vapors other than steam.

A practical example of the operation of the method, with an apparatus of the character described, is the case of drying sliced pineapples, which is one of the most difficult of fruits to dry effectively. It is found that a temperature of 180 degrees Fahrenheit gives the best results and the application of a higher temperature, which causes more rapid evaporation, will scorch the fruit when the drying operation is nearly completed. This is evidenced when the fruit turns dark and takes on rather an unpleasant taste. In the apparatus shown, motive steam for causing the circulation is supplied through pipe 6. This steam issues through the jet nozzle 8 in the throat of the Venturi tube 9 at an extremely high velocity and draws a large amount of steam from the drying chamber through the pipe 12 and the T-coupling 7. From this point, the steam passes through the pipe line 10 to the heater 5, where it is superheated by the high pressure steam supplied by pipe line 3 to the coil 4. The superheated steam then passes by pipe 11 into the casing and through the latter in contact with the pineapple and back through the discharge pipe 12 in continuous circuit. The interior pressure within the chamber 1 is maintained at approximately 3 pounds absolute or 24 inches of vacuum, referred to a 30 inch barometer. The steam enters the chamber, under these conditions, at 180 degrees Fahrenheit, corresponding to a superheat of approximately 40 degrees. This superheated steam passing over the fruit at a high velocity causes evaporation of the moisture within the fruit and is itself cooled until at the left end of the drying chamber it may have reached a temperature of approximately 140 degrees Fahrenheit, which is saturation temperature at this pressure. Since water vapor is being given off from the fruit and since, in addition to this, motive steam is being supplied and enters the apparatus, there will be a considerable amount of steam which must pass out through the condenser by way of pipe 13, as hereinbefore described. Under these conditions, complete drying of sliced pineapple can be accomplished in approximately three hours and other fruits may be similarly dried by observing the proper conditions of pressure and temperature and circulation of the steam within the drying chamber.

It will be understood that the apparatus described is more or less diagrammatic and constitutes no part of the present invention, which is directed to the method, the essential features of which are the rapid circulation of rarefied superheated steam in contact with the material to be dried.

It is to be particularly noted that the drying operations, as described, are carried out under conditions involving the practical exclusion of air, so that any oxidation of the materials undergoing drying is avoided. This is particularly advantageous when the materials contain vitamins, especially spinach and various vegetables rich in vitamin C, which are susceptible to destruction by oxidation. Furthermore the method is adapted to the drying or desiccating of materials in solution or suspension in liquids, such as fruit and vegetable juices, which operation is effected by spraying the liquids into the circulating body of steam, the rarefied superheated steam completely enveloping the sprayed liquid evaporating the watery content thereof out of contact with air, thereby precluding impairment of the dried product by oxidation.

What I claim is:

1. The method of drying fruits, vegetables and the like, which comprises maintaining a low absolute pressure or partial vacuum in a chamber containing the articles to be dried, and circulating superheated steam at said absolute pressure through said chamber by a steam jet interposed in the circulatory system.

2. The method of drying fruits, vegetables and the like, which comprises maintaining a low absolute pressure or partial vacuum in a chamber containing the articles to be dried, and rapidly circulating superheated steam at said absolute pressure through said chamber.

3. The method of drying fruits, vegetables and the like, which comprises maintaining a low absolute pressure or partial vacuum in a chamber containing the articles to be dried, rapidly circulating superheated steam at said absolute pressure through said chamber, and withdrawing the excess moisture from said chamber.

4. The method of drying fruits, vegetables and the like, which comprises maintaining a low absolute pressure or partial vacuum in a chamber containing the articles to be dried, rapidly circulating superheated steam at said absolute pressure through said chamber, and continuously withdrawing the excess moisture from said chamber.

5. The method of drying fruits, vegetables and the like, which comprises subjecting the same to circulating steam under low absolute pressure and at a superheat insufficient to discolor the fruit.

6. The method of drying fruits, vegetables and the like, which comprises subjecting the same to circulating steam under an absolute pressure of approximately three pounds and at a temperature of approximately 180 degrees Fahrenheit.

In testimony whereof I affix my signature.

SIMES T. HOYT.